United States Patent
Chung et al.

(10) Patent No.: US 9,698,672 B2
(45) Date of Patent: Jul. 4, 2017

(54) INPUT FILTER FOR A POWER ELECTRONIC SYSTEM

(71) Applicant: City University of Hong Kong, Kowloon (HK)

(72) Inventors: Shu Hung Henry Chung, Mid-levels (HK); Kuen Faat Yuen, New Territories (HK); Wing To Fan, New Territories (HK)

(73) Assignee: City University of Hong Kong, Hong Kong (HK)

( * ) Notice: Subject to any disclaimer, the term of this patent is extended or adjusted under 35 U.S.C. 154(b) by 205 days.

(21) Appl. No.: 14/305,268

(22) Filed: Jun. 16, 2014

(65) Prior Publication Data
US 2015/0364991 A1    Dec. 17, 2015

(51) Int. Cl.
*H02M 1/44* (2007.01)
*H02M 3/156* (2006.01)
*H02M 1/00* (2006.01)

(52) U.S. Cl.
CPC ............ *H02M 1/44* (2013.01); *H02M 3/156* (2013.01); *H02M 2001/007* (2013.01); *H02M 2001/0045* (2013.01)

(58) Field of Classification Search
CPC . H02M 2001/0045; H02M 2001/0087; H02M 2001/007; H02M 1/44; G05F 1/462; G05F 1/563; G05F 1/59; G05F 1/565
See application file for complete search history.

(56) References Cited

U.S. PATENT DOCUMENTS

| 4,881,023 A * | 11/1989 | Perusse | G01S 7/282 323/266 |
| 5,132,893 A * | 7/1992 | Klein | G05F 1/563 323/901 |
| 6,388,432 B2 * | 5/2002 | Uchida | G06F 1/324 323/266 |
| 6,850,044 B2 * | 2/2005 | Hansen | H02M 3/156 323/266 |
| 7,038,430 B2 * | 5/2006 | Itabashi | H02M 3/156 323/224 |
| 7,053,592 B2 * | 5/2006 | Pihet | G05F 1/575 323/266 |
| 7,183,756 B1 * | 2/2007 | Dikken | G05F 3/262 323/280 |

(Continued)

OTHER PUBLICATIONS

I. Kovacevic, T. Friedli, A. Musing and J. Kolar, "3-electromagnetic modeling of parasitics and mutual coupling in EMI filter," IEEE Trans. Power Electron, vol. 29, No. 1, pp. 135-149, and Jan 2014.

(Continued)

*Primary Examiner* — Fred E Finch, III
*Assistant Examiner* — Yusef Ahmed
(74) *Attorney, Agent, or Firm* — Renner Kenner Greive Bobak Taylor & Weber

(57) ABSTRACT

An input filter for a power electronic system includes a series-pass device arranged to control an input characteristic of a power converter, and a control mechanism arranged to control an operation of the series-pass device during a power conversion process, so as to filter a noise signal generated by the power converter from reaching a power source of the power electronic system.

23 Claims, 12 Drawing Sheets

(56) References Cited

U.S. PATENT DOCUMENTS

| | | | | | |
|---|---|---|---|---|---|
| 7,486,056 | B2* | 2/2009 | Shuey | | H02M 3/156 307/35 |
| 7,498,778 | B2* | 3/2009 | Seiersen | | H02J 1/10 323/269 |
| 7,642,762 | B2* | 1/2010 | Xie | | H02M 3/156 315/224 |
| 7,646,189 | B2* | 1/2010 | Chen | | H02M 3/156 323/224 |
| 7,759,914 | B2* | 7/2010 | Odell | | H02M 3/1588 323/225 |
| 8,154,262 | B2* | 4/2012 | Kanayama | | H02M 3/158 323/266 |
| 8,222,772 | B1* | 7/2012 | Vinciarelli | | H02M 1/4258 307/140 |
| 8,847,571 | B2* | 9/2014 | Kielb | | G05B 19/0423 323/224 |
| 8,970,136 | B2* | 3/2015 | Kikuchi | | 315/291 |
| 2002/0130645 | A1* | 9/2002 | Tsai | | G05F 1/24 323/274 |
| 2005/0057300 | A1* | 3/2005 | Ishii | | H02M 3/07 327/536 |
| 2005/0184712 | A1* | 8/2005 | Wei | | H02M 3/156 323/282 |
| 2005/0275387 | A1* | 12/2005 | Mitter | | H02M 1/15 323/266 |
| 2006/0132112 | A1* | 6/2006 | Oswald | | H02M 3/1584 323/282 |
| 2007/0114981 | A1* | 5/2007 | Vasquez | | H02M 3/158 323/266 |
| 2008/0246420 | A1* | 10/2008 | Mi | | H05B 41/3921 315/312 |
| 2009/0219004 | A1* | 9/2009 | Hirano | | H02M 1/36 323/293 |
| 2009/0262556 | A1* | 10/2009 | Tomiyoshi | | H02M 3/1582 363/17 |
| 2010/0157638 | A1* | 6/2010 | Naiknaware | | H02M 7/4807 363/131 |
| 2010/0164289 | A1* | 7/2010 | Umminger | | H02J 1/10 307/55 |
| 2010/0329293 | A1* | 12/2010 | Taubman | | B82Y 20/00 372/38.02 |
| 2011/0026281 | A1* | 2/2011 | Chapman | | H02J 3/38 363/65 |
| 2011/0201281 | A1* | 8/2011 | Bakalski | | H04B 1/48 455/73 |
| 2012/0249093 | A1* | 10/2012 | Grbo | | H02M 3/1588 323/234 |
| 2014/0049235 | A1* | 2/2014 | Li | | G05F 1/46 323/271 |
| 2014/0125299 | A1* | 5/2014 | Barth | | H03F 3/00 323/266 |
| 2014/0145504 | A1* | 5/2014 | Kayama | | H02J 7/0055 307/23 |
| 2014/0252950 | A1* | 9/2014 | Kikuchi | | H05B 33/0815 315/77 |
| 2015/0263614 | A1* | 9/2015 | Bansal | | G01R 19/2506 323/282 |
| 2015/0312983 | A1* | 10/2015 | Hu | | F21K 9/1355 315/186 |
| 2015/0364989 | A1* | 12/2015 | Chung | | H02M 1/4208 363/44 |
| 2016/0056770 | A1* | 2/2016 | Delepaut | | H02M 3/158 330/297 |

OTHER PUBLICATIONS

W. Tan, C. Cuellar, X. Margueron, and N. Idir, "A high frequency equivalent circuit and parameter extraction, procedure for common mode choke in the EMI filter," IEEE Trans. Power Electron., vol. 28, No. 3, pp. 1157-1166, Mar. 2013.

T. Shimizu, H. Yamajio, K. Takano, and H. Ishii, "Loss evaluation of AC filter inductor core on a PWM converter," in Proceeding of IEEE 81 h International Conference on Power Electronics and ECCE Asia (ICP E & ECCE), pp. 1047-1052, 2011.

M.M. Jovanovic, "Survey of state-of-the-art technologies for computer-network server power supplies," Journal of Circuits, Systems, and Computers, vol. 13, No. 3, pp. 399-423, 2004.

* cited by examiner

INPUT FILTER FOR A POWER ELECTRONIC SYSTEM

TECHNICAL FIELD

The present invention relates to an input filter for a power electronic system, and particularly, although not exclusively, to a power semiconductor filter for a switching converter.

BACKGROUND

Electrical apparatus and electronic devices such as computers and mobile phones may operate at different operating voltages of electrical source. Accordingly, electrical power is required to be stepped up or down to a suitable operating voltage for different electronic devices. It is also common that each of these apparatus or devices may comprises different operating modules which operates at different operating voltages, hence multiple power converters may be also included in these apparatus or devices.

In these electronic devices, power converters such as switching converters may be used to convert the electrical power to a required operating voltage. A switching converter includes switching network with a plurality of transistor switches, and operates at a high frequency during the power conversion process, which generate noise signal in a form of unwanted electrical and electromagnetic noise, and may affect the power source when transmitted back to the source from the conversion stage, hence the noise signal should be filtered by a filter in the input stage.

SUMMARY OF THE INVENTION

In accordance with a first aspect of the present invention, there is provided an input filter for a power electronic system comprising: a series-pass device arranged to control an input characteristic of a power converter; and a control mechanism arranged to control an operation of the series-pass device during a power conversion process, so as to filter a noise signal generated by the power converter from reaching a power source of the power electronic system.

In an embodiment of the first aspect, the input characteristic of the power converter includes an input current waveform of the power converter.

In an embodiment of the first aspect, the series-pass device is connected in series with an input of the power converter.

In an embodiment of the first aspect, the series-pass device is a bipolar junction transistor.

In an embodiment of the first aspect, the series-pass device is arranged to operate in an active region of a current-voltage characteristic of the series-pass device.

In an embodiment of the first aspect, an operating point of the series-pass device is regulated at boundaries between an active region and a saturation region of a current-voltage characteristic of the series-pass device.

In an embodiment of the first aspect, the control mechanism is a feedback mechanism arranged to receive an output voltage of the power converter and to generate an input signal for the series-pass device so as to control the input characteristic of the power converter.

In an embodiment of the first aspect, the feedback mechanism is an error amplifier arranged to compare the output voltage of the power converter with a first reference voltage.

In an embodiment of the first aspect, the error amplifier is a proportional-plus-integral controller.

In an embodiment of the first aspect, the first reference voltage equals to a predetermined output voltage of the power converter.

In an embodiment of the first aspect, wherein an input capacitor is arranged to absorb a high-frequency current pulse generated by the power converter.

In an embodiment of the first aspect, wherein the input capacitor is a film type capacitor.

In an embodiment of the first aspect, the input characteristic of the power converter includes an input voltage of the power converter.

In an embodiment of the first aspect, further comprising a voltage controller arranged to sense a voltage across the series-pass device, and to control the input voltage of the power converter.

In an embodiment of the first aspect, the voltage controller includes a voltage comparator arranged to compare the sensed voltage across the series-pass device with a second reference voltage, and to output an error voltage to a switch driver arranged to control the input voltage of the power converter.

In an embodiment of the first aspect, the second reference voltage is slightly greater than a saturation voltage of the series-pass device.

In an embodiment of the first aspect, the switch driver is also arranged to control a switching frequency and/or a duty cycle of the input voltage of the power converter.

In an embodiment of the first aspect, the power converter is a DC-DC converter.

In an embodiment of the first aspect, the power converter is a switching converter.

In an embodiment of the first aspect, the power converter is a buck converter.

In an embodiment of the first aspect, further comprises a monolithically integrated structure.

In accordance with a second aspect of the present invention, there is provided an electrical power switching converter, comprising: a switching network arranged to process an input electrical power between an electrical power source and an electrical load; an input filter in accordance with claim 1, wherein the series-pass device is connected in series connected between an input of the switching network and the electrical power source; and an output filter connected between the electrical load and the switching network.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that, a power electronic system may comprises three key sections: input filter, high-frequency switching network, and output filter. The switching network is the main power processing unit that manipulates the power flow between the source and the load with low power dissipation. The input filter is used to prevent unwanted noise generated by the switching network from getting into the source, and assure compliance with regulatory electromagnetic compatibility standards, while the output filter is used to pass wanted electrical output form and attenuate unwanted noise to the load. Both filters are typically made up of passive components.

As practical switching devices and passive components are non-ideal, major amount of power losses is in the conduction and switching losses of the switching network, and the ohmic and magnetic core losses of the passive components of the filters. Although new and emerging materials, device technologies, and network topologies may result in reducing the losses of the switching devices and increasing the switching frequency for reducing the filter size, the filter sections still occupy considerable space and constitute a major part of the total power loss. The ever-increasing density of power electronic systems is straining system designers' abilities to squeeze space for the filters without sacrificing performance. The filter section is a key limiting factor in advancing the power density and performance of the power electronic systems.

Figure 1:
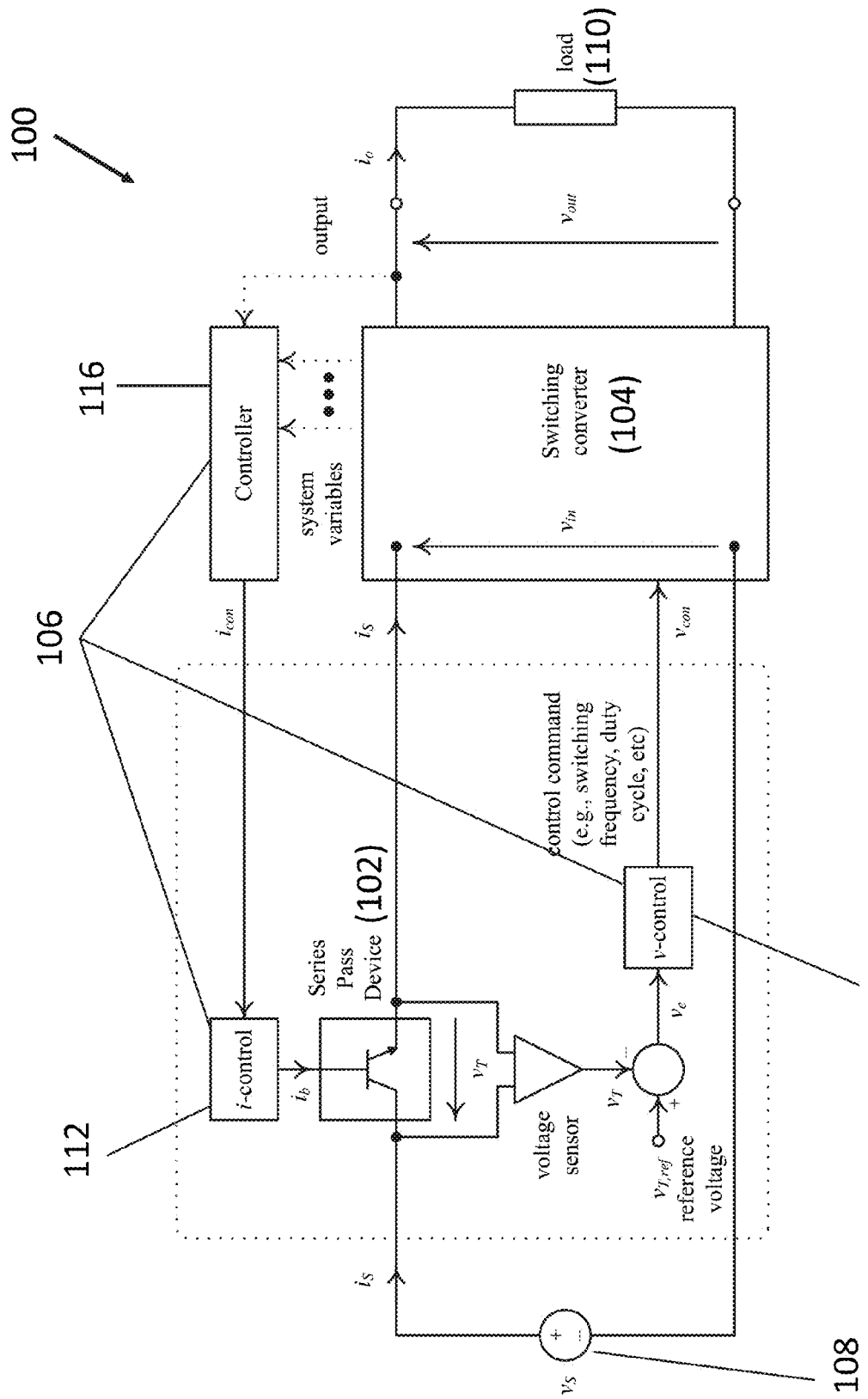
FIG. 1 is a schematic diagram illustrating an input filter for a power electronic system in accordance with one embodiment of the present invention.

With reference to FIG. 1, there is shown an embodiment of an input filter for a power electronic system 100 comprising: a series-pass device 102 arranged to control an input characteristic of a power converter 104; and a control mechanism 106 arranged to control an operation of the series-pass device 102 during a power conversion process, so as to filter a noise signal generated by the power converter 104 from reaching a power source 108 of the power electronic system 100.

In this embodiment, the power electronic system 100 comprises a power converter 104 which is a switching converter, or it may be other DC-DC converters such as a buck converter, a boost converter or a buck-boost converter for processing and converting the input power to a form suitable for the electrical load 110. During operation, the switching network of the switching converter 104 operates at a high switching frequency, and may generate high frequency noise signal which may then be transmitted to the power source 108 of the power electronic system 100, and such noise signal may be filtered by an input filter. Preferably, the series-pass device 102 (SPD) in the input filter is a bipolar junction transistor (BJT), and the BJT 102 is controlled by a control mechanism 106 during operation, in which the BJT 102 is regulated to operate in the active region of the current-voltage characteristics of the BJT 102.

Preferably, the SPD or the BJT 102, is connected in series with the switching converter 104. The operating point of the SPD 102 is regulated at the boundary between the active and the saturation regions by a control mechanism 106, which comprises two controllers: "i-control" 112 and "v-control" 114. The "i-control" 112 has its input $i_{con}$ connected to the output of a controller 116 for regulating the system output, such as the output voltage $v_{out}$, and has its output $i_b$ to control the input current $i_S$. Hence, the input current waveform of the power converter 104 is controlled by the SPD 102 controlled by the control mechanism 106.

The input of the "v-control" 114 is the error $v_e$ between the voltage $v_T$ across the SPD 102 and a reference voltage $v_{T,ref}$. Preferably, $v_{T,ref}$ is set at slightly higher than the saturation voltage (e.g. less than 1V), so as to reduce the power dissipation in the SPD 102. The output of the "v-control" 114, $v_{con}$ is used to control the input voltage of the switching converter 104 $v_{in}$ by changing some control variables, such as the switching frequency and duty cycle of the switches in the switching converter 104. With this feedback mechanism 106, $i_S$ has low noise and the power dissipation of the SPD 102 is kept low.

Figure 2A:
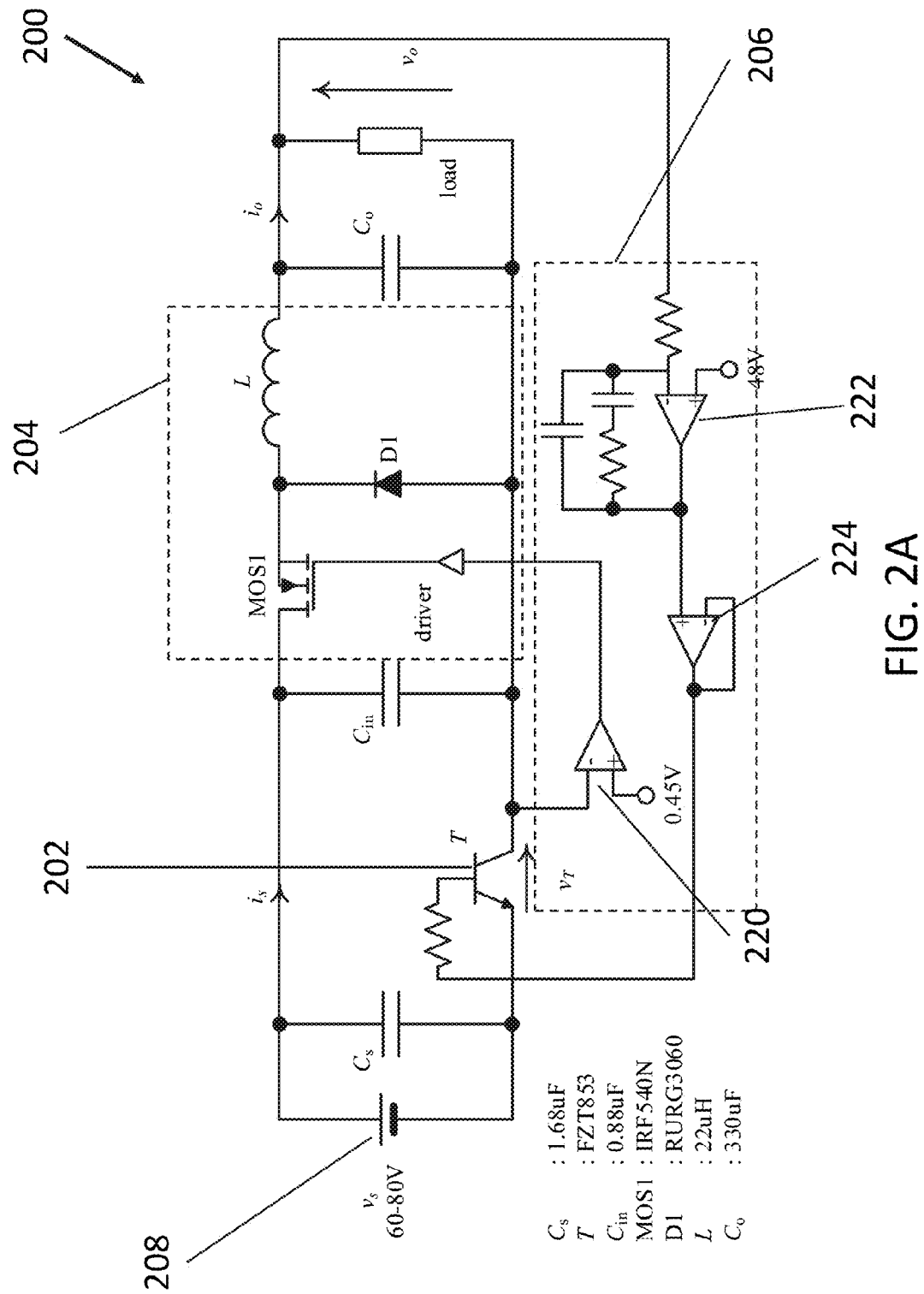
FIG. 2A is a schematic diagram illustrating an input filter for a power electronic system in accordance with another embodiment of the present invention.
Figure 2B:
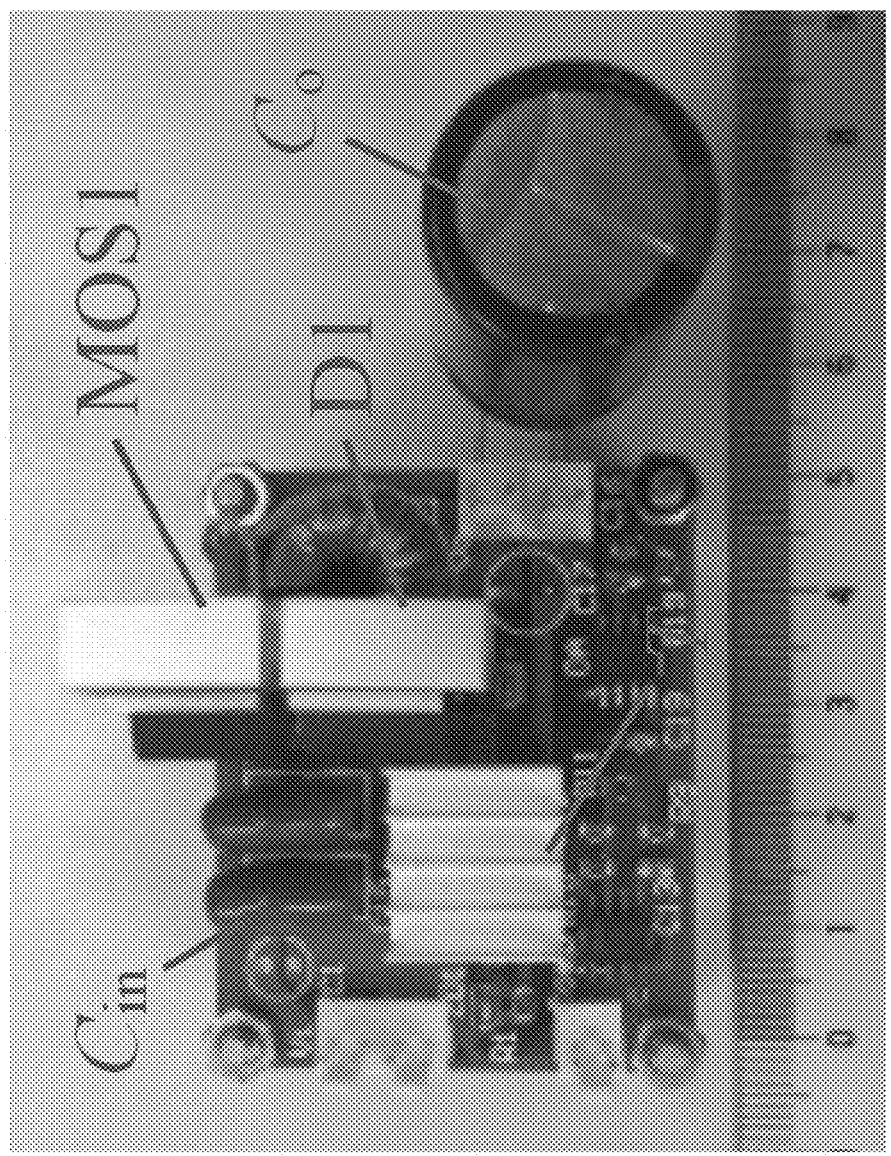
FIG. 2B is a photographic image of the power electronic system of FIG. 2A.

With reference to FIGS. 2A and 2B, there is shown an embodiment of an input filter for a power electronic system 200 comprising: a series-pass device 202 arranged to control an input characteristic of a power converter 204; and a control mechanism 206 arranged to control an operation of the series-pass device 202 during a power conversion process, so as to filter a noise signal generated by the power converter 204 from reaching a power source 208 of the power electronic system 200.

In this embodiment, the power converter 204 is a buck DC-DC converter, which may operate either in continuous conduction mode (CCM) or discontinuous conduction mode (DCM). The power electronic system 200 further comprises an input capacitor $C_{in}$. The input filter of the present invention, which may also known as a power semiconductor filter (PSF), includes a BJT T (202). $C_{in}$ is connected in parallel with the input of the power converter 204, while T is connected in series with the input of the power converter 204. $C_{in}$ is used to absorb the high-frequency current pulses generated by the buck converter 204, so as to make the input current of the entire system $i_S$ constant. The capacitor $C_S$ is used to filter the noise, caused by the non-ideal characteristics of the series-pass device.

The voltage across T, $v_T$, is sensed and compared with a reference voltage $v_{T,ref}$ (the second reference voltage, which is 0.45V in this embodiment), by a voltage comparator 220. If $v_T<v_{T,ref}$ MOS1 will be turned on by the MOSFET driver and D1 is off, in order to reduce the voltage across $C_{in}$. Conversely, if $v_T>v_{T,ref}$ MOS1 will be turned off and D1 is on, in order to increase the voltage across $C_{in}$. This bang-bang control mechanism is an example of the "v-control" block 114 in FIG. 1 for regulating $v_T$ at $v_{T,ref}$.

The hysteresis band of the voltage comparator 220 determines the switching frequency the buck converter 204. The output voltage $v_o$ is regulated by a feedback loop. It is sensed and compared with a reference voltage 48V (the first reference voltage, which is the predetermined output voltage of the power converter 204) by an error amplifier 222, which is a proportional-plus-integral controller. The output of the error amplifier 222 generates the signal to the base current $i_b$ of T to control the input current $i_S$. This forms the feedback control of the "i-control" block 112 in FIG. 1.

The operational parameters in CCM and DCM are defined in the following table, in which f is the switching frequency, $d_1$ is the duty cycle of MOS1, $d_2$ is the duty cycle of D1, $\Delta v_o$ is the peak-to-peak output voltage ripple, $I_{L,max}$ and $I_{L,min}$ are the maximum and minimum current through the inductor L, $L_{min}$ is the minimum value of the inductor L that ensures the buck converter 204 operating in CCM, Io is the steady state value of output current, $v_o$ is the steady state value of output voltage, $v_S$ is the steady state value of the voltage source and $v_T$ is the steady state value of the voltage across T.

| Parameter | CCM | DCM* |
|---|---|---|
| f | $\dfrac{d_1(1-d_1)I_o}{C_{in}\Delta v_T}$ | $\dfrac{I_o^3 LV_o^3 + C_{in}\Delta v_T I_o V_o (V_x - V_o) V_x^2 - \sqrt{I_o^4 L V_o^4 \left[ I_o^2 L V_o^2 + 2C_{in}\Delta v_T V_x^2(V_x - V_o) \right]}}{C_{in}^2 \Delta v_T^2 (V_x - V_o) V_x^3}$ |
| $d_1$ | $\dfrac{V_o}{V_s - V_T}$ | $\sqrt{\dfrac{2V_o I_o Lf}{(V_s - V_T)(V_s - V_T - V_o)}}$ |
| $d_2$ | $1 - d_1$ | $\dfrac{2fLI_o}{d_1(V_s - V_T - V_o)}$ |
| $\Delta v_o$ | $\dfrac{V_o(1-d_1)}{8C_o Lf^2}$ | $\dfrac{(I_{L,max} - I_o)^2(d_1 + d_2)}{2LC_o I_{L,max} f}$ |
| $I_{L,max}$ | $I_o + \dfrac{(V_x - V_o)d_1}{2Lf}$ | $\dfrac{d_1(V_s - V_T - V_o)}{Lf}$ |
| $I_{L,min}$ | $I_o - \dfrac{(V_x - V_o)d_1}{2Lf}$ | 0 |
| $L_{min}$ |  | $\dfrac{C_{in}\Delta v_T (V_s - V_T)}{2I_o^2}$ |

*$V_x = V_s - V_T$

These embodiments are advantageous in that, the input filter is semiconductor-based, which require a small film-type input capacitor, hence the lifetime of the entire power electronic system can be ensured. The physical size can be significantly reduced as compared with passive filter such as an inductor-capacitor (LC) filter or a low-pass filter, and the reduction is estimated to be at least 30% in the input filtering section, while providing competitive efficiency. The input filter is effective in filtering the noise signal generated by the switching network with low power dissipation and low noise.

Advantageously, since the input filter is semiconductor-based, the input filter may comprise a monolithically integrated structure. For example, this allows the input filter to be packaged as an integrated circuit chip, or the input filter may be integrated to the switching network of the switching converter.

Figure 3A:
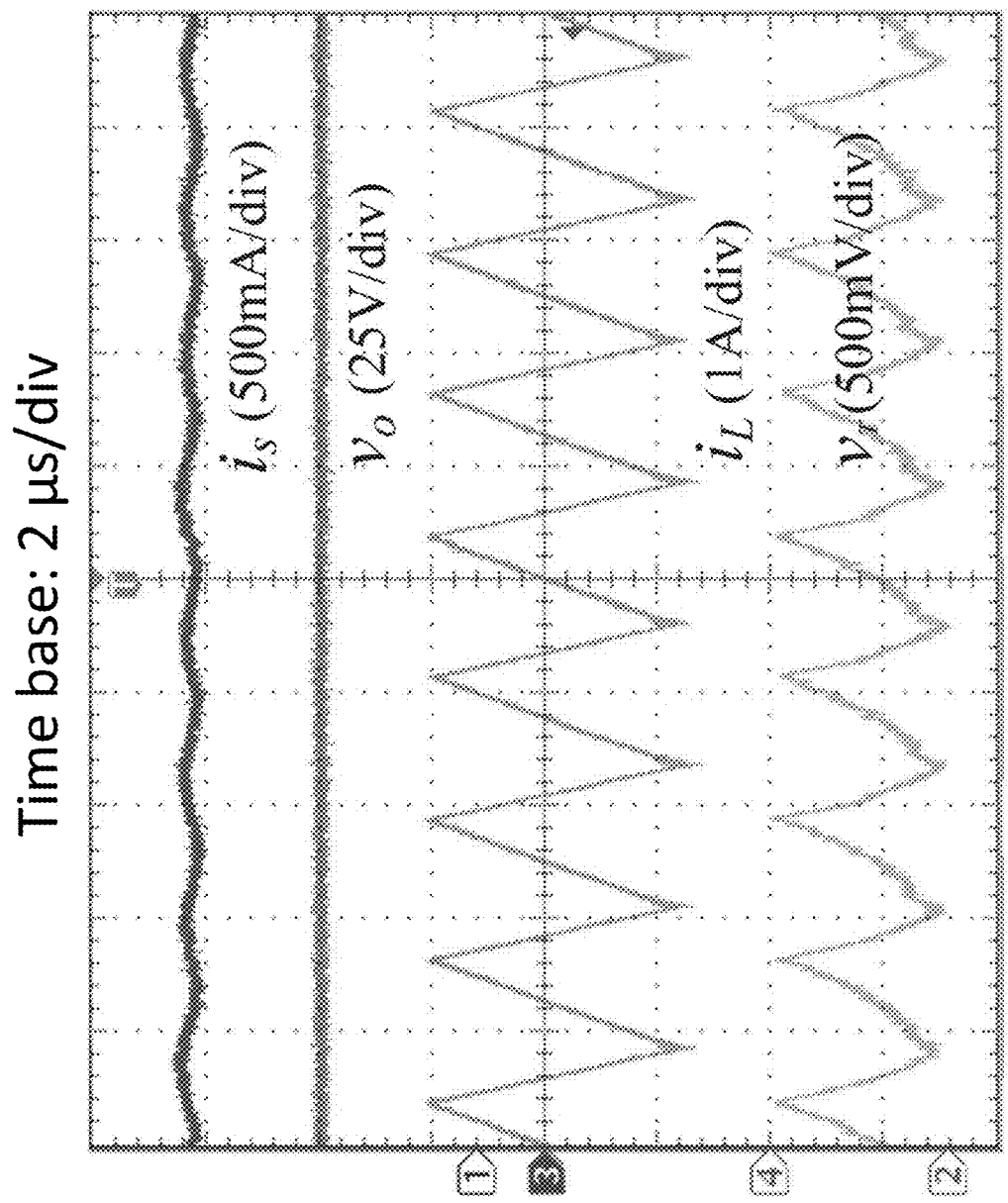
FIG. 3A is a plot showing the waveforms of $i_S$, $v_o$, $v_T$ and $i_L$ of the power electronic system of FIG. 2A during a power conversion process when the load is 100% of the rated condition for the input voltage $v_S$ of 80V.
Figure 3B:
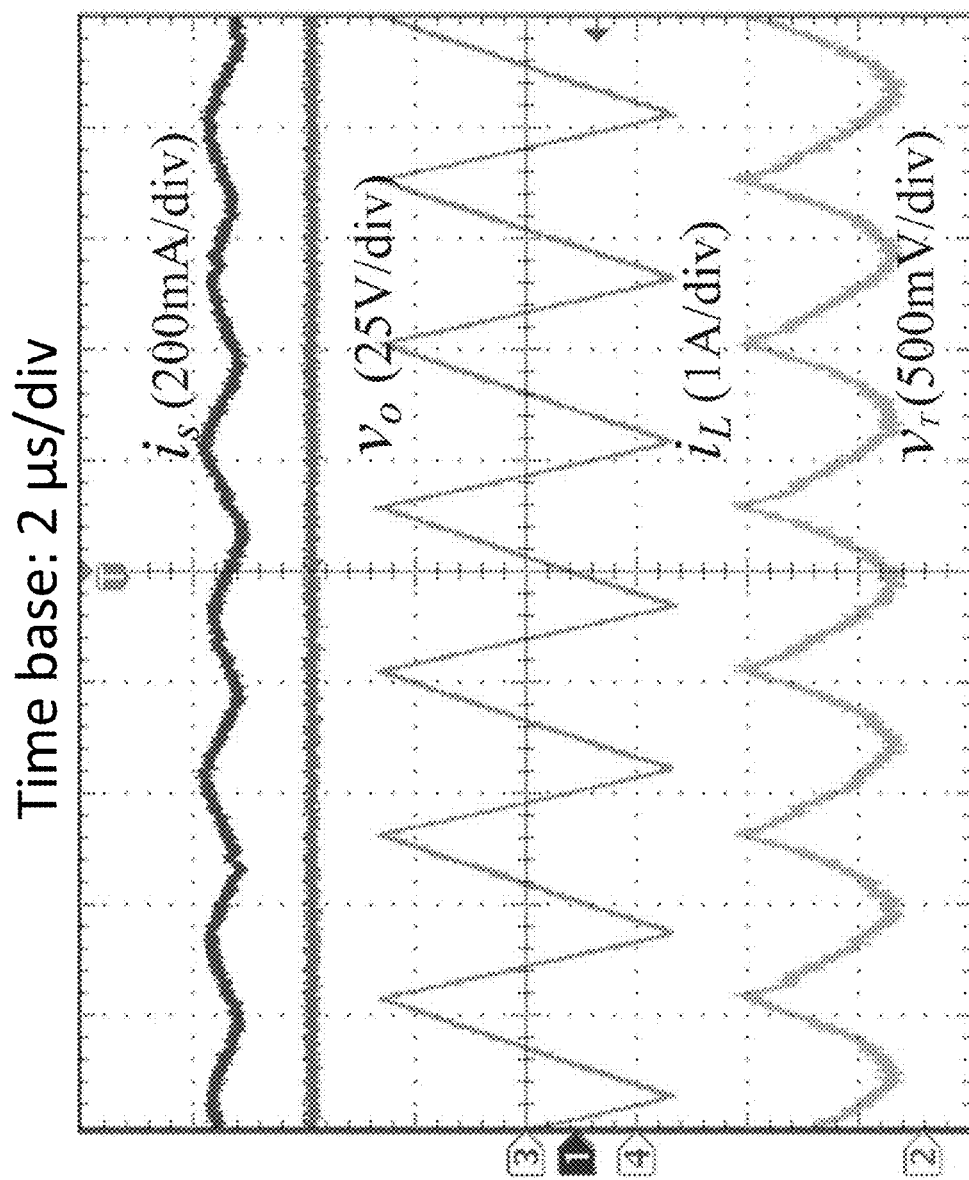
FIG. 3B is a plot showing the waveforms of $i_S$, $v_o$, $v_T$ and $i_L$ of the power electronic system of FIG. 2A during a power conversion process when the load is 50% of the rated condition for the input voltage $v_S$ of 80V.
Figure 3C:
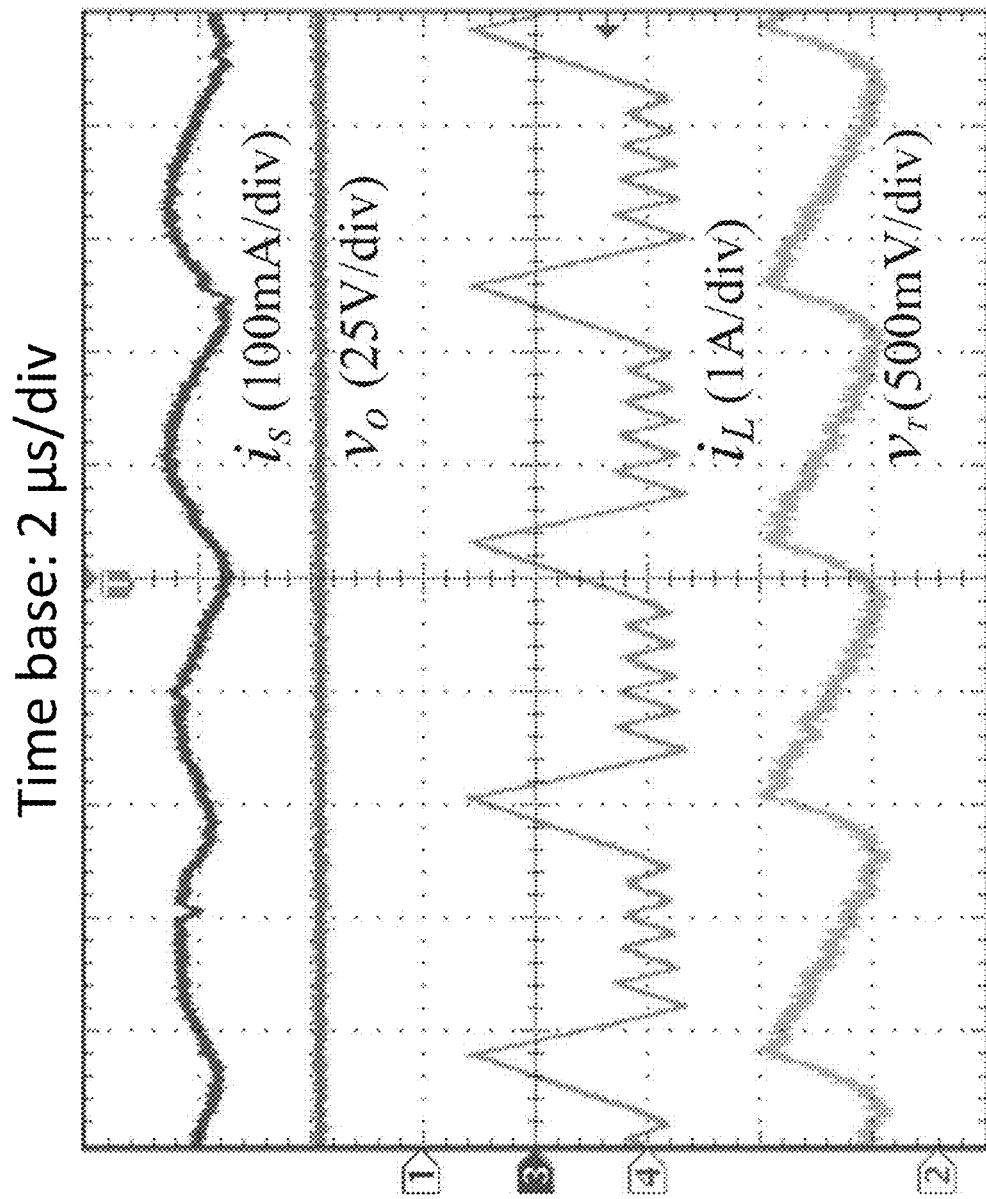
FIG. 3C is a plot showing the waveforms of $i_S$, $v_o$, $v_T$ and $i_L$ of the power electronic system of FIG. 2A during a power conversion process when the load is 10% of the rated condition for the input voltage $v_S$ of 80V.

The input filter as shown in FIGS. 2A and 2B may operate in the input stage of a 100 W, 60-80V/48V DC-DC converter. With reference to FIGS. 3A to 3C, there is shown the waveforms of $i_S$, $v_o$, the voltage across the SPD, $v_T$, and $i_L$ with the PSF when the load is 100%, 50%, and 10% of the rated condition for the input voltage $v_S$ of 80V. The input current is fairly constant in the three cases with the ripple currents of 31.6 mA (6.10% of the average current) at 10% load, 40 mA (6.58% of the average current) at 50% load, and 53.2 mA (4.06% of the average current) at 100% load.

Figure 4:
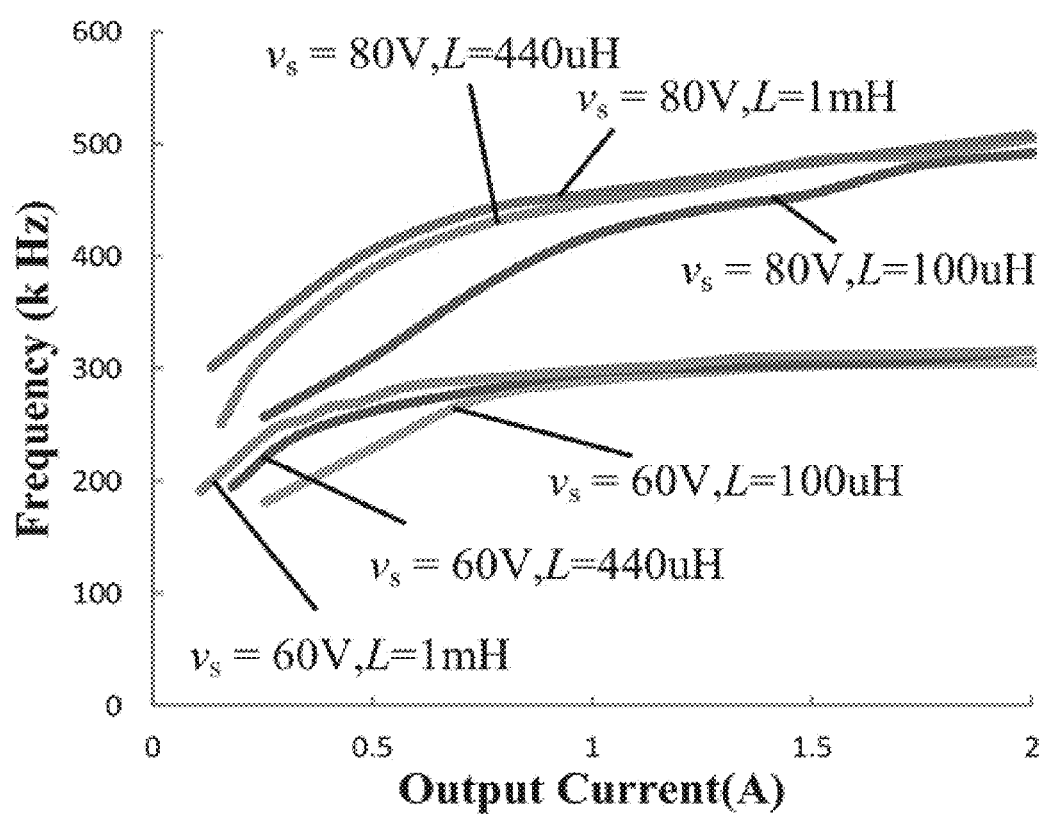
FIG. 4 is a plot showing the switching frequency against $i_o$ with different values of L in the power converter of FIG. 2A.
Figure 5:
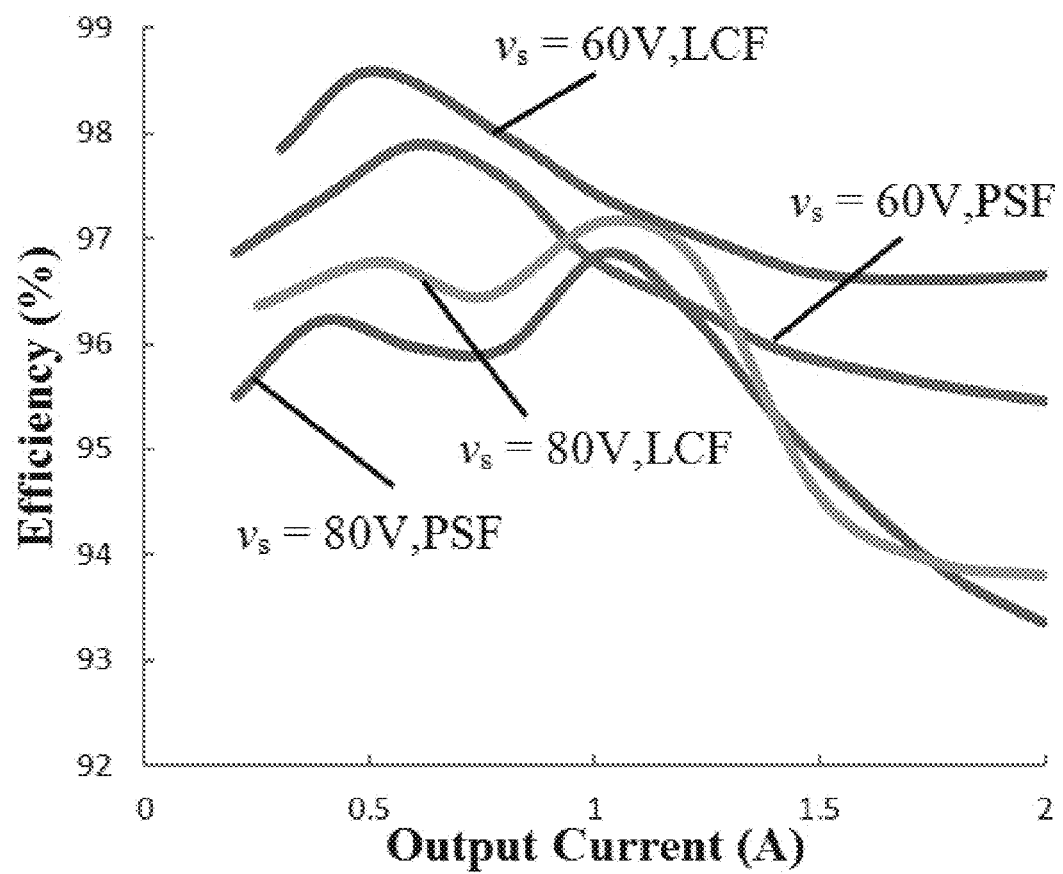
FIG. 5 is a plot showing a comparison of the efficiency with the input voltage $v_S$ of 60V and 80V, with an input LC filter and with the input filter for a power electronic system of FIG. 2A.

With reference to FIGS. 4 to 5, there is shown the output performance of the input filter of FIG. 2B. FIG. 4 shows the switching frequency against the output current $i_o$ with different values of L in the power electronic system, and FIG. 5 shows a comparison of the efficiency with the input voltage $v_S$ of 60V and 80V, respectively, under two different configurations: 1) with the input LC filter as the input filtering stage ($L_f$=360 nH, $C_f$=4.7 µF) that gives similar filtering performance, and 2) with the PSF of FIG. 2B. Results reveal that the efficiency with the PSF is comparable with the passive filter. Furthermore, the efficiency difference of PSF and passive filter narrowed down if the input voltage is increased this showed that PSF have a potential to overtake passive filter in high voltage application due to the ratio of $v_T$ and $v_S$ is keep decreasing and the fact that ESR of high-voltage capacitor is large. Thus, in terms of physical size and cost of materials, the PSF outperforms the LC filter. In general, the efficiency can achieve at least 93% from 5% load to 100% with the PSF.

Figure 6A:
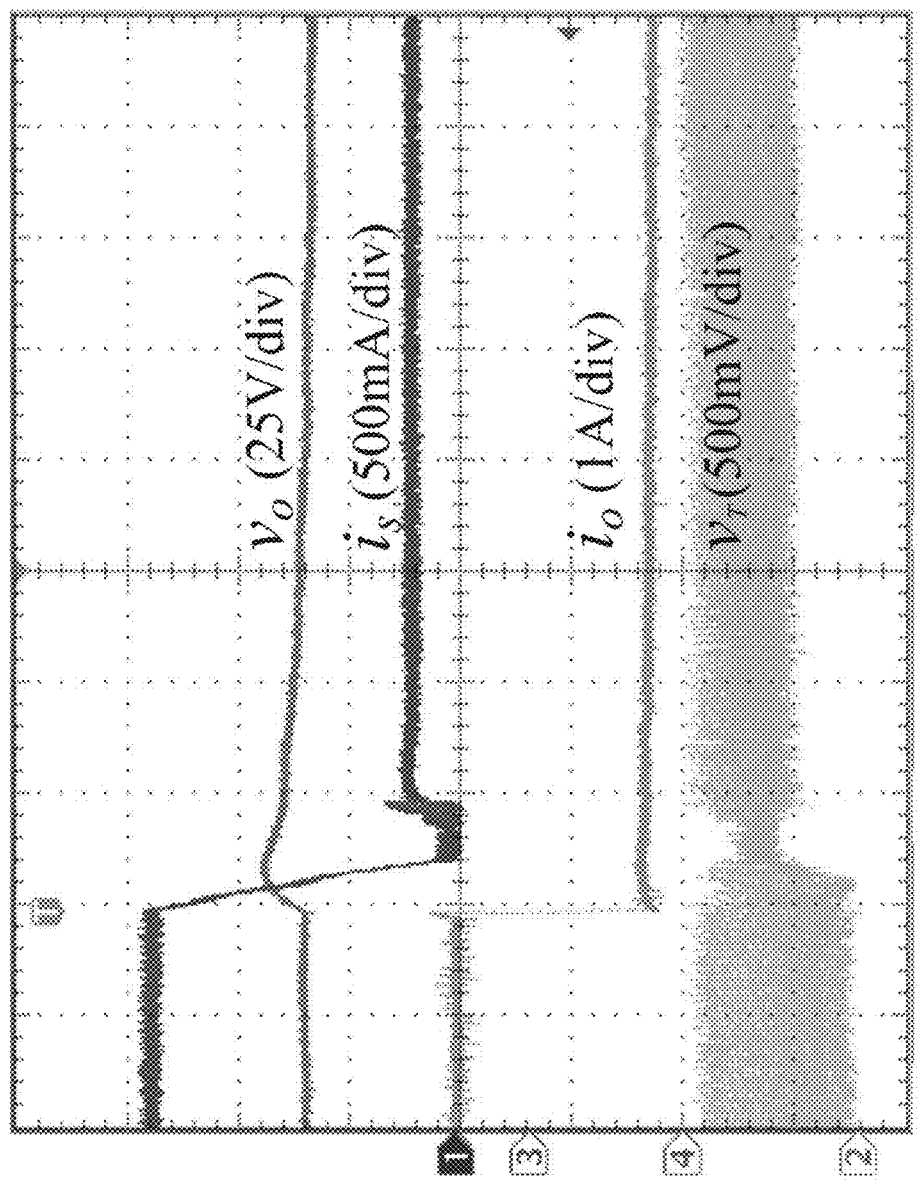
FIG. 6A is a plot showing the waveforms of $i_S$, $i_o$, $v_o$ and $v_T$ and the transient response of the power electronic system of FIG. 2A when the load current is changed from 2 A to 0.25 A.
Figure 6B:
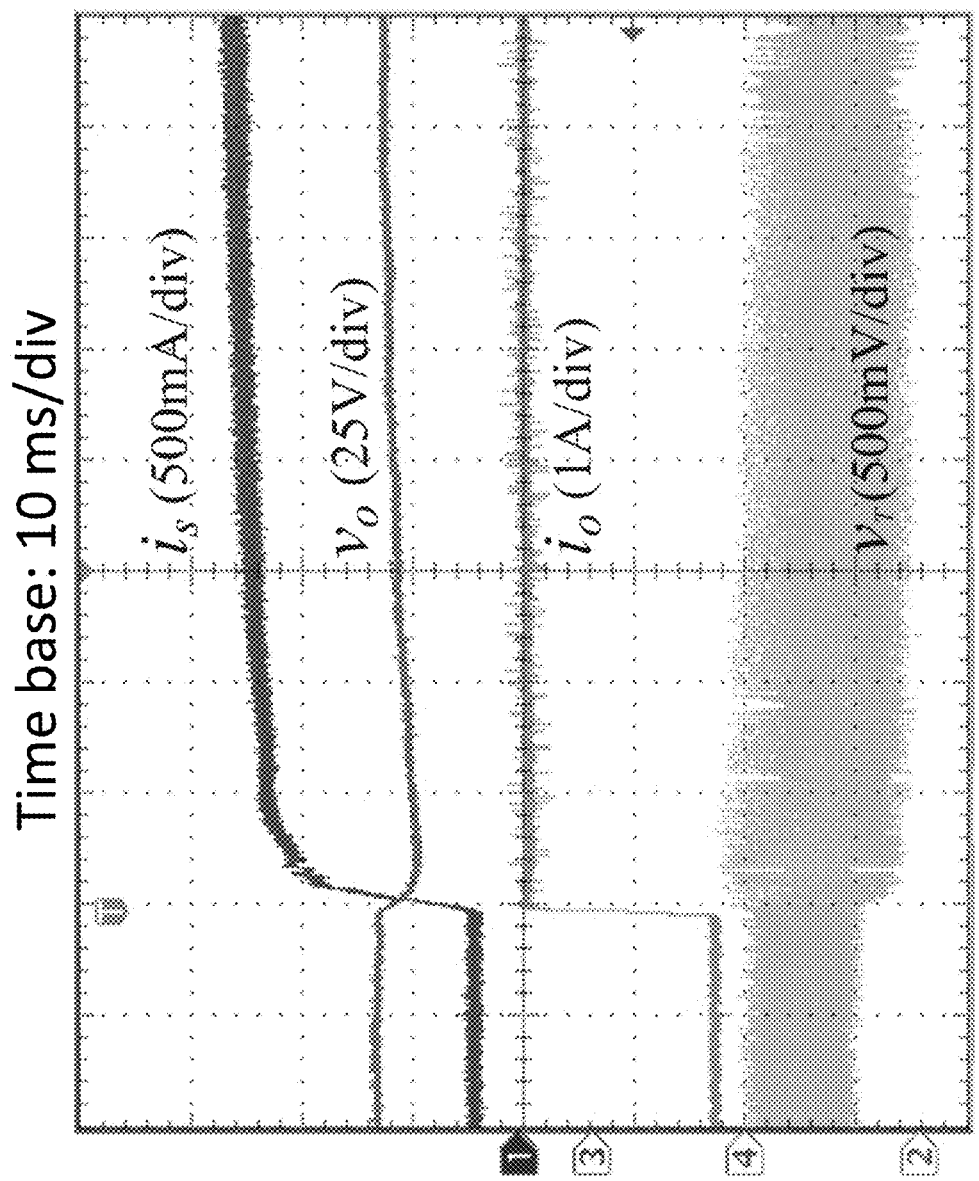
FIG. 6B is a plot showing the waveforms of $i_S$, $i_o$, $v_o$ and $v_T$ and the transient response of the power electronic system of FIG. 2A when the load current is changed from 0.25 A to 2 A.

The transient response of the converter with the PSF when the load current $i_o$ is suddenly changed between 2 A (100%) and 0.25 A (12.5%) is studied in $v_S$ of 80V. As shown in FIG. 6, which shows the waveforms of $i_S$, $i_o$, $v_o$, and $v_T$ under the load disturbances. $v_T$ varies between 100 mV and 790 mV with average $v_T$ of 480 mV, which is less than the voltage drop of an diode.

Figure 7A:
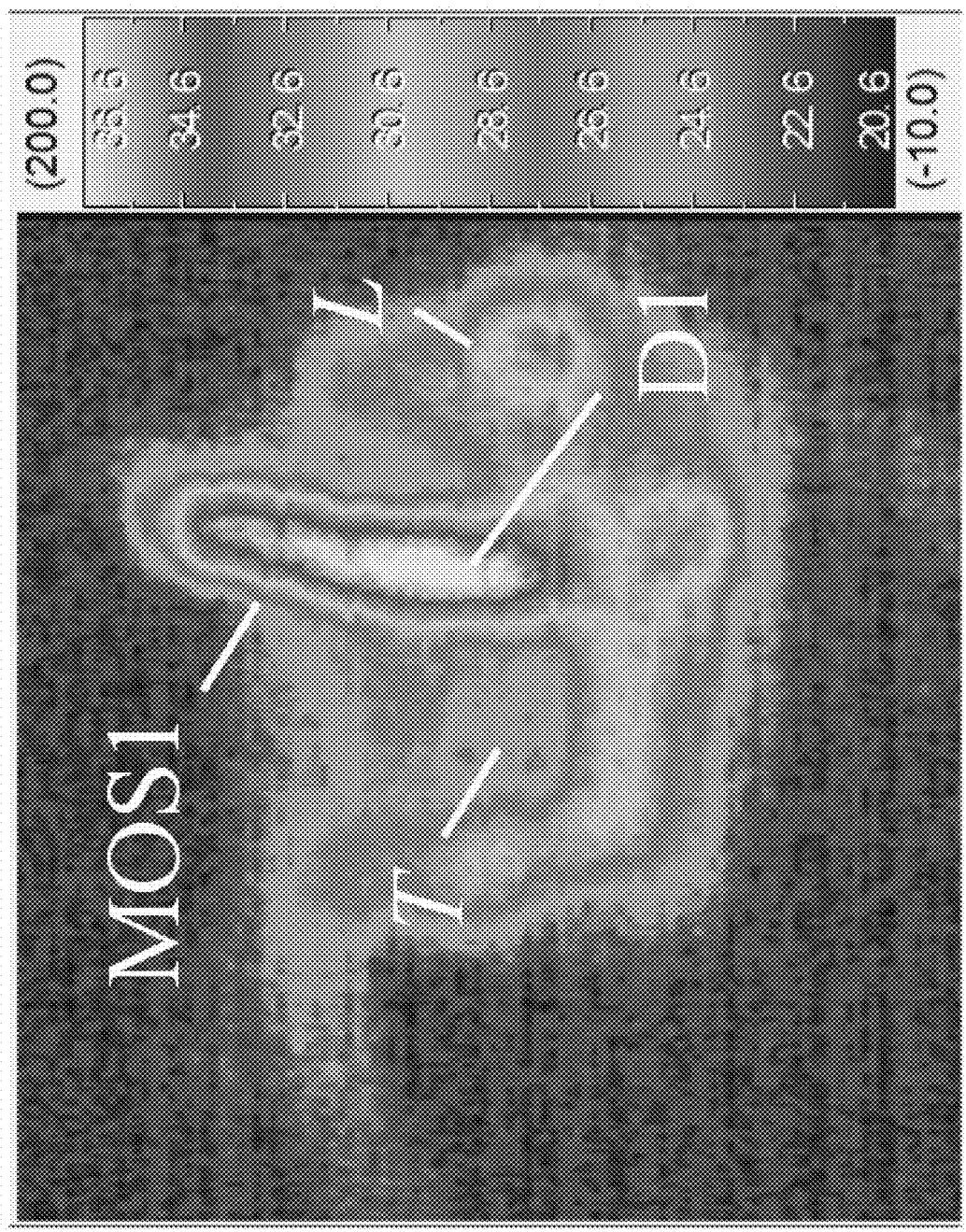
FIG. 7A is a plot showing the thermal distribution on the top of the PCB of the power electronic system of FIG. 2B during a power conversion process when the load is 100% of the rated condition for the input voltage $v_S$ of 60V.
Figure 7B:
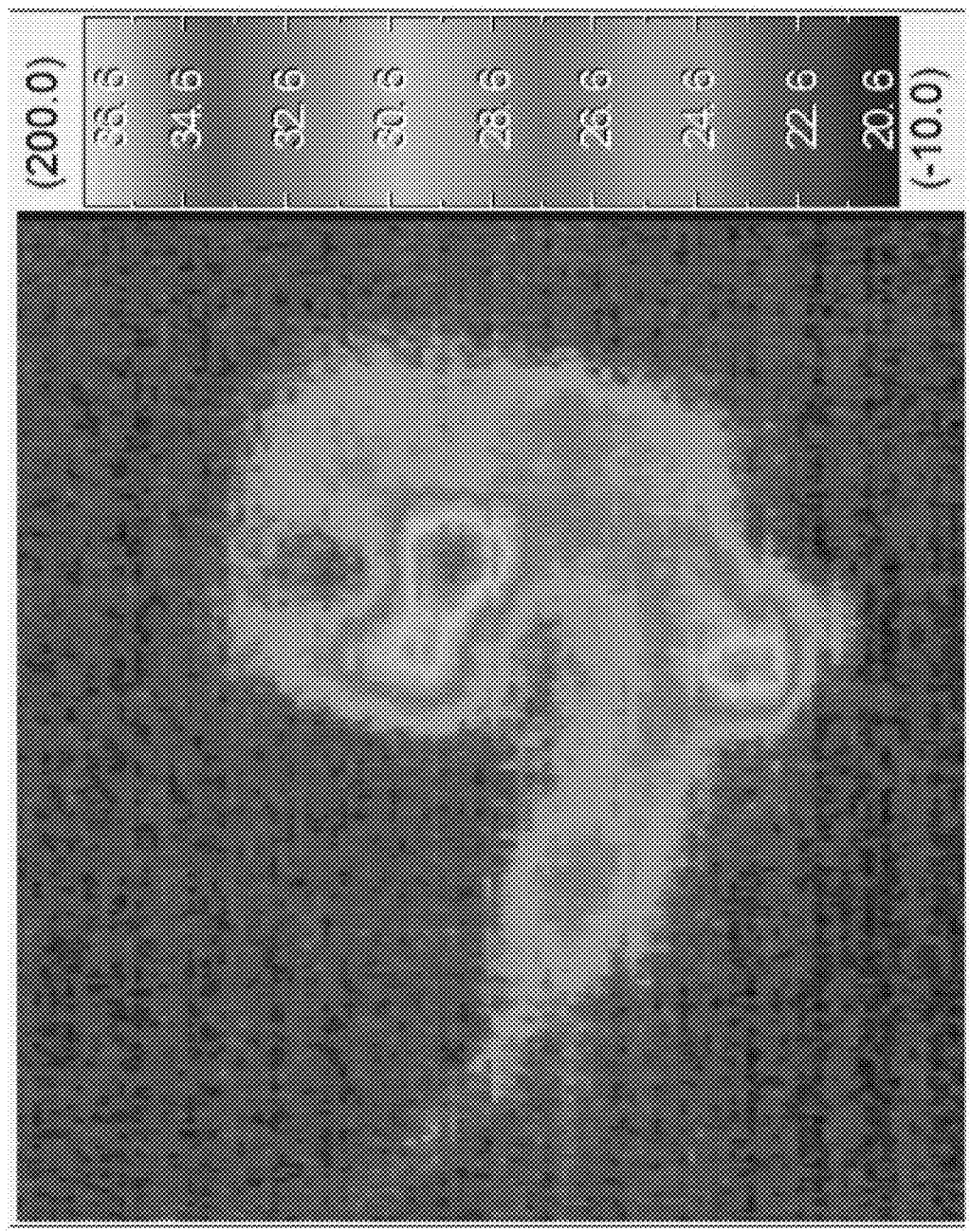
FIG. 7B is a plot showing the thermal distribution on the bottom of the PCB of the power electronic system of FIG. 2B during a power conversion process when the load is 100% of the rated condition for the input voltage $v_S$ of 60V.

With reference to FIGS. 7A and 7B, there is shown the thermal distribution on the top and the bottom of the printed circuit board of the input filter of FIG. 2B at the 100% loading at the input voltage of $v_S$ at 60V. It can be seen that the BJT in the PSF does not contribute the major power loss in the entire power conversion system.

Without deviating from the spirit of the invention, the input filter for a power electronic system can be implemented to filter undesired noise signal generated in an input stage of an electronic system, such as a power converting stage in an electrical apparatus or an electronic device, or each of the power converting stage in the electrical apparatus.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A filter circuit arrangement for a power electronic system, comprising:
   a feedback circuit connected between an output of a power converter and an input to one or more switches of the power converter, the feedback circuit comprising
      a series-pass device selectively controlled to effect control of one or more operation parameters of the one or more switches to thereby control an input characteristic of a power converter;
      a voltage sensor arranged to sense a voltage across the series-pass device for controlling the one or more operation parameters of the one or more switches; and
      a voltage comparator arranged to compare the sensed voltage across the series-pass device with a second reference voltage, and to output a voltage for controlling the one or more operation parameters of the one or more switches;
   wherein the series-pass device is connected in series between an input of the power converter and a power source; and
   wherein the series-pass device is controlled such that noise signal generated by the one or more switches is filtered and is prevented from reaching the power source.

2. The filter circuit arrangement for a power electronic system in accordance with claim 1, wherein the input characteristic of the power converter comprises at least one of: an input current of the power converter and an input voltage of the power converter.

3. The filter circuit arrangement for a power electronic system in accordance with claim 1, wherein the series-pass device is a bipolar junction transistor.

4. The filter circuit arrangement for a power electronic system in accordance with claim 1, wherein the series-pass device is arranged to operate in an active region of a current-voltage characteristic of the series-pass device.

5. The filter circuit arrangement for a power electronic system in accordance with claim 4, wherein an operating point of the series-pass device is regulated at boundaries between an active region and a saturation region of a current-voltage characteristic of the series-pass device.

6. The filter circuit arrangement for a power electronic system in accordance with claim 1, wherein the feedback circuit is arranged to receive an output voltage of the power converter and to generate an input signal for the series-pass device so as to control the input characteristic of the power converter.

7. The filter circuit arrangement for a power electronic system in accordance with claim 6, wherein the feedback circuit further comprises an error amplifier arranged to compare the output voltage of the power converter with a first reference voltage.

8. The filter circuit arrangement for a power electronic system in accordance with claim 7, wherein the error amplifier is a proportional-plus-integral controller.

9. The filter circuit arrangement for a power electronic system in accordance with claim 7, wherein the first reference voltage equals to a predetermined output voltage of the power converter.

10. The filter circuit arrangement for a power electronic system in accordance with claim 1, wherein the second reference voltage is slightly greater than a saturation voltage of the series-pass device.

11. The filter circuit arrangement for a power electronic system in accordance with claim 1, wherein the one or more operation parameters comprise: a switching frequency and/or a duty cycle of the one or more switches.

12. The filter circuit arrangement for a power electronic system in accordance with claim 1, wherein the power converter is one of: a DC-DC converter, a switching converter, and a buck converter.

13. The filter circuit arrangement for a power electronic system in accordance with claim 1, wherein the filter circuit arrangement has a monolithically integrated structure.

14. A power electronic system, comprising:
   a power converter comprising an input and an output, and being formed at least in part by one or more switches, wherein the power converter is arranged between a power source and a load;
   a feedback circuit connected between the output of the power converter and an input to the one or more switches, the feedback circuit comprising
      a series-pass device selectively controlled to effect control of one or more operation parameters of the one or more switches to thereby control an input characteristic of a power converter;
      a voltage sensor arranged to sense a voltage across the series-pass device for controlling the one or more operation parameters of the one or more switches; and
      a voltage comparator arranged to compare the sensed voltage across the series-pass device with a second reference voltage, and to output a voltage for controlling the one or more operation parameters of the one or more switches;
   wherein the series-pass device is connected in series between the input of the power converter and the power source; and
   wherein the series-pass device is controlled such that noise signal generated by the one or more switches is filtered and is prevented from reaching the power source.

15. The power electronic system in accordance with claim 14, wherein the input characteristic of the power converter comprises at least one of: an input current of the power converter and an input voltage of the power converter.

16. The power electronic system in accordance with claim 14, wherein the series-pass device is a bipolar junction transistor.

17. The power electronic system in accordance with claim 14, wherein the one or more operation parameters comprise: a switching frequency and/or a duty cycle of the one or more switches.

18. The power electronic system in accordance with claim 14, wherein the power converter is one of: a DC-DC converter, a switching converter, and a buck converter.

19. The power electronic system in accordance with claim 14, wherein the feedback circuit is arranged to receive an output voltage of the power converter and to generate an input signal for the series-pass device so as to control the input characteristic of the power converter.

20. The power electronic system in accordance with claim 19, wherein the feedback circuit further comprises:
   an error amplifier arranged to compare the output voltage of the power converter with a first reference voltage.

21. The power electronic system in accordance with claim 14, further comprising an input capacitor connected across the input of the power converter, wherein the input capacitor is arranged to absorb a high-frequency current pulse generated by the power converter.

22. The power electronic system in accordance with claim 19, wherein the input capacitor is a film type capacitor.

23. A method for operating a filter circuit arrangement in a power electronic system, comprising the steps of:
providing a feedback circuit between an output of a power converter and an input to one or more switches of the power converter, the feedback circuit comprising a series-pass device connected in series between an input of the power converter and a power source;
selectively controlling the series-pass device to effect control of one or more operation parameters of the one or more switches, thereby controlling an input characteristic of a power converter such that noise signal generated by the one or more switches is filtered and is prevented from reaching the power source, the selective control step comprising:
sensing a voltage across the series-pass device;
comparing the sensed voltage across the series-pass device with a reference voltage; and
outputting a voltage after the comparison for controlling the one or more operation parameters of the one or more switches.

* * * * *